United States Patent
Gintis et al.

(10) Patent No.: US 9,749,213 B2
(45) Date of Patent: Aug. 29, 2017

(54) METHODS, SYSTEMS, AND COMPUTER READABLE MEDIA FOR MICROBURST TESTING

(71) Applicant: Ixia, Calabasas, CA (US)

(72) Inventors: Noah Steven Gintis, Westlake Village, CA (US); Vinod Joseph, Thousand Oaks, CA (US); Anton-Valentin Pandichie, Bucuresti (RO); Cristian Florin Iordache, Bucharest (RO)

(73) Assignee: Ixia, Calabasas, CA (US)

( * ) Notice: Subject to any disclaimer, the term of this patent is extended or adjusted under 35 U.S.C. 154(b) by 56 days.

(21) Appl. No.: 14/796,441

(22) Filed: Jul. 10, 2015

(65) Prior Publication Data
US 2016/0373334 A1    Dec. 22, 2016

(30) Foreign Application Priority Data

Jun. 19, 2015   (RO) ............................. A 2015 00417

(51) Int. Cl.
*H04L 12/26*   (2006.01)

(52) U.S. Cl.
CPC ............ *H04L 43/50* (2013.01); *H04L 43/087* (2013.01); *H04L 43/0817* (2013.01); *H04L 43/0829* (2013.01)

(58) Field of Classification Search
None
See application file for complete search history.

(56) References Cited

U.S. PATENT DOCUMENTS

2010/0165872 A1* 7/2010 Jiang ................... H04L 43/0817
                                                             370/253

OTHER PUBLICATIONS

"Lab Test Report DR100401G, Cisco Nexus 5000 Arista 7100 Switches", Miercom, pp. 1-35 (Apr. 26, 2010).*
Newman, "10 Gigabit data center switch shootout," http://www.networkworld.com/article/2870099/lan-wan/10-gigabit-data-center-switch-shootout.html#slide1, Network World, pp. 1-7 (Jan. 18, 2010).
"Myths about Microbursts," https://www.arista.com/assets/data/pdf/7148sx-ixnetwork-microburst.pdf, ARISTA, pp. 1-9 (Sep. 29, 2009).
Mandeville et al., "Benchmarking Methodology for LAN Switching Devices," RFC 2889, pp. 1-35 (Aug. 2000).
Bradner et al., "Benchmarking Methodology for Network Interconnect Devices," RFC 2544, pp. 1-31 (Mar. 1999).
Mandeville, "Benchmarking Terminology for LAN Switching Devices," RFC 2285, pp. 1-25 (Feb. 1998).

* cited by examiner

*Primary Examiner* — Charles C Jiang
*Assistant Examiner* — Saad Khawar
(74) *Attorney, Agent, or Firm* — Jenkins, Wilson, Taylor & Hunt, P.A.

(57) ABSTRACT

Methods, systems, and computer readable media for microburst testing are disclosed. According to one method, the method includes defining a test that is divided into one or more test cycles, wherein each test cycle includes a plurality of time intervals for providing packets to destination ports of N ports of the network equipment test device via a plurality of ports of a network switch under test, wherein N is an integer. The method further includes initializing a replication count. The method also includes executing an instance of the test using the replication count. The method further includes monitoring packets switched by each port of the network switch under test to determine an indication of buffering capacity of each port of the network switch under test.

15 Claims, 6 Drawing Sheets

400

---ITERATION PARAMETERS---------------
SEARCH BASED ON    PEAK LOADING ▼
LOAD TYPE          CUSTOM ▼
LOAD UNIT          % LINE RATE ▼
LOAD RATE LIST     100
--- PEAK LOADING SEARCH ---
LOAD TYPE          STEP ▼
INITIAL COUNT      1000
END COUNT          2000
STEP COUNT         200
--- ACCEPTABLE THRESHOLDS ---
FRAME LOSS         0    % ▼
☐ LATENCY <=       10   US ▼   AVERAGE/PORT ▼
☐ JITTER <=        10   US ▼   AVERAGE/PORT ▼
☐ SEQ ERRORS <=    0            AVERAGE/PORT ▼
☐ INTEGRITY ERRORS <=  0
☐ FLOODED FRAMES <=    0

*FIG. 4A*

ITERATION PARAMETERS

| | |
|---|---|
| SEARCH BASED ON | PEAK LOADING ▼ |
| LOAD TYPE | CUSTOM ▼ |
| LOAD UNIT | % LINE RATE ▼ |
| LOAD RATE LIST | 100 |

PEAK LOADING SEARCH

| | |
|---|---|
| LOAD TYPE | BINARY ▼ |
| MAX COUNT | 1000 |
| MIN COUNT | 10 |
| INITIAL COUNT | 100 |
| RESOLUTION | 50 |
| BACKOFF % | 50 |

ACCEPTABLE THRESHOLDS

| | | | |
|---|---|---|---|
| FRAME LOSS | 0 | % ▼ | |
| ☐ LATENCY <= | 10 | US ▼ | AVERAGE/PORT ▼ |
| ☐ JITTER <= | 10 | US ▼ | AVERAGE/PORT ▼ |
| ☐ SEQ ERRORS <= | 0 | | AVERAGE/PORT ▼ |
| ☐ INTEGRITY ERRORS <= | 0 | | |
| ☐ FLOODED FRAMES <= | 0 | | |

METHODS, SYSTEMS, AND COMPUTER READABLE MEDIA FOR MICROBURST TESTING

PRIORITY CLAIM

This application claims the benefit of Romanian Patent Application No. a 2015 00417, filed Jun. 19, 2015; the disclosure of which is incorporated herein by reference in its entirety.

TECHNICAL FIELD

The subject matter described herein relates to test configuration. More specifically, the subject matter relates to methods, systems, and computer readable media for microburst testing.

BACKGROUND

Network operators typically test network nodes for reliability and other characteristics before deploying the network nodes in live (e.g., non-test environments). Generally, it is important to test networks nodes with various amounts of traffic and different types of traffic. For example, a test platform, such as an IxNetwork™ platform manufactured by Ixia, may be usable for network topology testing and traffic analysis and may generate realistic, dynamically-controllable data-plane traffic, such as multiple packets flows, for testing various network nodes using one or more protocols.

Various tests can be performed to test or measure different aspects of a network node. For example, some tests are designed to mimic a microburst of packets to a network switch. A microburst is a short spike of packets, typically arriving at a network node at a rate exceeding its processing speeds (e.g., greater than throughput rate). For example, a microburst may arise when high-speed data sources feed slower speed links. Generally, network nodes are equipped to handle microbursts by using buffers to queue the packets received. However, microbursts can trigger packet loss or other issues if the buffers used become full. Generally, such packet loss is not detrimental since a traffic source typically retransmits the packets as soon as it discovers the loss. However, because of packet retransmissions, a microburst may trigger additional microbursts and/or related issues (e.g., losses, retransmissions, and/or significant delays) associated with microbursts.

Since microbursts generally occur over short periods of time, it is a possibility for microbursts to be overlooked and/or underevaluated by test operators, especially if traffic is being monitored using averages computed over long durations. For example, a 10 millisecond microburst of traffic every second may only utilizes a small portion (e.g., less than 2%) of link capacity. Hence, if average traffic statistics are monitored over longer durations, microbursts are likely to be overlooked. Therefore, microbursts can be difficult to discover, analyze, and resolve.

Accordingly, a need exists for improved methods, systems, and computer readable media for microburst testing.

SUMMARY

Methods, systems, and computer readable media for microburst testing are disclosed. According to one method, the method includes defining a test that is divided into one or more test cycles, wherein each test cycle includes a plurality of time intervals for providing packets to destination ports of N ports of the network equipment test device via a plurality of ports of a network switch under test, wherein N is an integer. The method further includes initializing a replication count, which defines a number of consecutive time intervals, wherein, during each of the consecutive time intervals, at least N−1 packets are transmitted to a same destination port of the N ports of the network equipment test device via at least one of the ports of the network switch under test. The method also includes executing an instance of the test using the replication count. The method further includes monitoring packets received by each port of the network switch under test to determine an indication of buffering capacity of each port of the network switch under test.

According to one system, the system includes at least one processor and a network equipment test device implemented using the at least one processor. The network equipment test device is configured to define a test that is divided into one or more test cycles, wherein each test cycle includes a plurality of time intervals for providing packets to destination ports of N ports of the network equipment test device via a plurality of ports of a network switch under test, wherein N is an integer, to initialize a replication count, which defines a number of consecutive time intervals, wherein, during each of the consecutive time intervals, at least N−1 packets are transmitted to a same destination port of the N ports of the network equipment test device via at least one of the ports of the network switch under test, to execute an instance of the test using the replication count, and to monitor packets switched by each port of the network switch under test to determine an indication of buffering capacity of each port of the network switch under test.

The subject matter described herein may be implemented in software in combination with hardware and/or firmware. For example, the subject matter described herein may be implemented in software executed by a processor. In some embodiments, the subject matter described herein may be implemented using a non-transitory computer readable medium having stored thereon computer executable instructions that when executed by the processor of a computer control the computer to perform steps. Various computer readable media suitable for implementing the subject matter described herein include non-transitory devices, such as disk memory devices, chip memory devices, programmable logic devices, field-programmable gate arrays, and application specific integrated circuits. In addition, a computer readable medium that implements the subject matter described herein may be located on a single device or computing platform or may be distributed across multiple devices or computing platforms.

As used herein, the term "node" refers to at least one physical computing platform including one or more processors, network interfaces, and memory.

As used herein, each of the terms "function" and "module" refer to hardware, firmware, or software in combination with hardware and/or firmware for implementing features described herein.

BRIEF DESCRIPTION OF THE DRAWINGS

The subject matter described herein will now be explained with reference to the accompanying drawings of which:

FIGS. 4A-4B are diagrams illustrating graphical user interfaces (GUIs) for searching microburst testing results according to an embodiment of the subject matter described herein.

DETAILED DESCRIPTION

Figure 1:
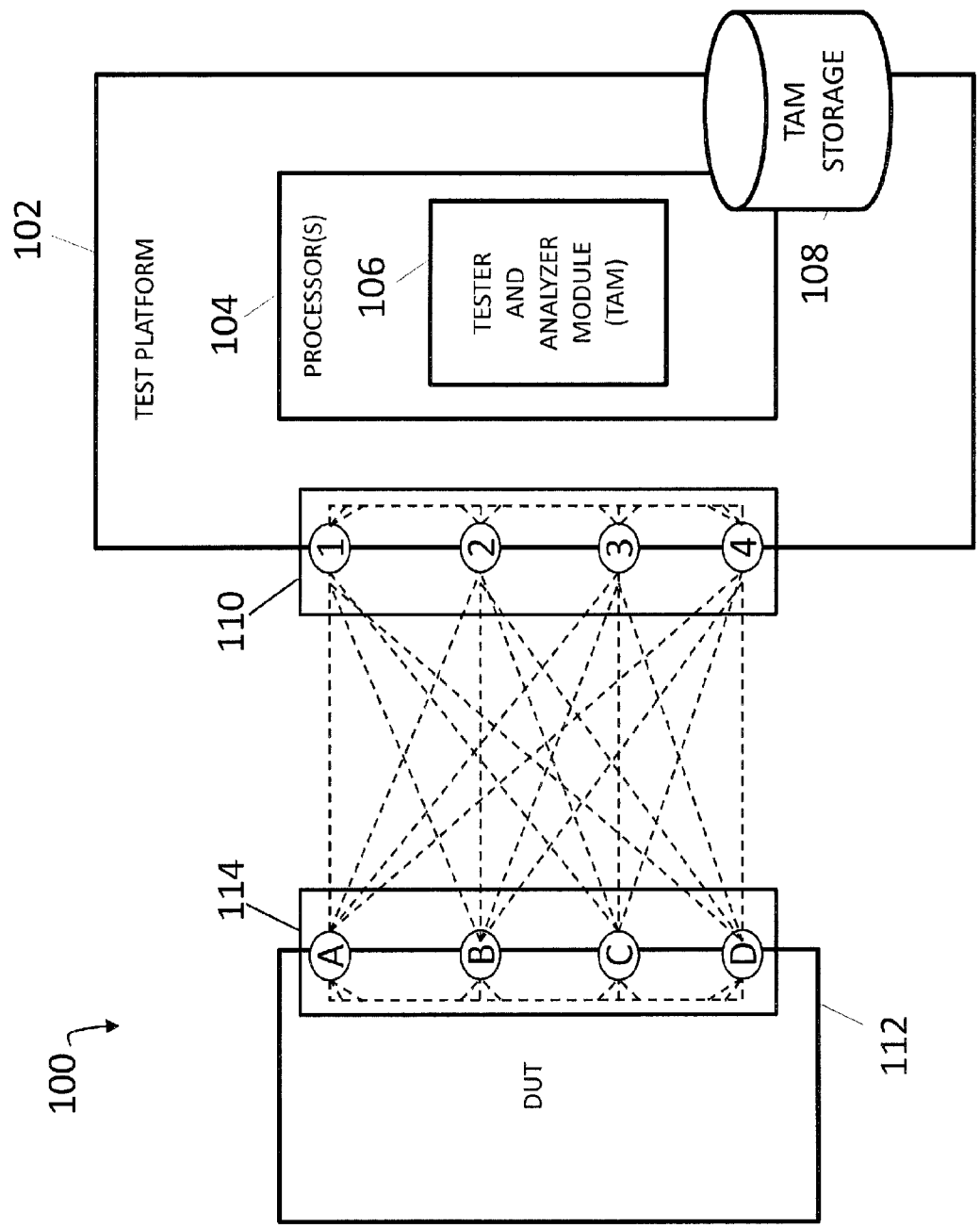
FIG. 1 is a diagram illustrating an environment for microburst testing according to an embodiment of the subject matter described herein.

The subject matter described herein relates to methods, systems, and computer readable media for microburst testing. When testing network nodes, a test platform may be capable of performing various tests with various goals by generating network traffic and monitoring and/or analyzing a network node's response to the network traffic. For example, a test platform may perform a test designed to identify a "peak load" across ports of a network switch that does not result in packet loss or latency above an acceptable threshold. While such tests may be useful for estimating a "peak load", such tests are generally misleading and/or incomplete, especially over a significant period of time, because these tests do not maintain an equal oversubscription across all test ports, thereby leading to some ports being more oversubscribed (e.g., loaded) than others. When one port becomes more oversubscribed than others, a buffer associated with that port will eventually become full and packets will be lost. Hence, such tests may provide some performance metrics, but may not be capable of identifying other potentially useful performance metrics, such as how well a network switch can handle an equal amount of oversubscription for a plurality of ports for a certain period of time (e.g., how much equal oversubscription can a plurality of ports of a network switch handle and/or how quickly and/or efficiently buffers are allocated or assigned to handle the oversubscription for the plurality of ports) Further, such tests may not prevent or identify issues associated with a switch under test, including indicating that certain ports are being favored over other ports or that dynamic buffer allocation is not implemented the same way for all the ports.

In accordance with some aspects of the subject matter described herein, techniques, methods, or mechanisms for microburst testing may utilize peak traffic ordering such that for every test or test cycle, the number of packets associated with each port that is received or switched by the device under test (DUT) is equal. For example, during a test involving eight ports sending packets via a network switch where each port is associated with a separate packet buffer at the network switch, each port may receive an equal number of packets during a test cycle. In this example, since each port receives an equal number of packets during the test cycle, no packet buffer at the network switch may be overloaded more than the other packet buffers after the test cycle is complete. Hence, the test may continue indefinitely assuming that the number of packets received by each port during each test cycle does not overfill the port's respective buffer.

In accordance with some aspects of the subject matter described herein, techniques, methods, or mechanisms for microburst testing may utilize replication counts for testing how a DUT handles different amounts oversubscription for a plurality of ports. In some embodiments, replication counts may relate to microburst phases and/or non-microburst phases. For example, a microburst phase may represent a time interval where a particular destination port is receiving more traffic that other destination ports of a test cycle, while a non-microburst phase for the destination port may represent a time interval where the destination port is receiving no traffic or less traffic than at least one other destination port of the test cycle. In this example, a microburst phase for one destination port can be a non-microburst phase for another destination port. Hence, the terms are relative to a particular destination port.

In some embodiments, a replication count may indicate how many time intervals comprise a microburst phase for a given destination port. For example, assuming N−1 packets are received at a destination port for each time interval in a test cycle, a test instance associated with a replication count of one may cause N−1 packets to be received at a first destination port in a microburst phase (e.g., a single time interval) for that destination port and a separate packet to be received at the first destination port in a non-microburst phase (e.g., a previous time interval) for that destination port. In another example, assuming N−1 packets are received at a destination port for each time interval in a test cycle, a test instance associated with a replication count of two may cause (2*(N−1)) packets to be received at a first destination port in a microburst phase (e.g., two time intervals) for that destination port and two packets to be received at the first destination port in a non-microburst phase (e.g., two previous time intervals) for that destination port.

In accordance with some aspects of the subject matter described herein, techniques, methods, or mechanisms for analyzing microburst testing may involve searching test results for a test involving a largest replication count having acceptable test results. For example, a test platform or a module may use a search algorithm for searching test results for identifying a test instance indicative of a largest replication count or packet load where the test instance resulted in an acceptable number of packet loss, latency, jitter, sequential errors, and/or flooded packets.

Reference will now be made in detail to various embodiments of the subject matter described herein, examples of which are illustrated in the accompanying drawings. Wherever possible, the same reference numbers will be used throughout the drawings to refer to the same or like parts.

FIG. 1 is a diagram illustrating an environment 100 for microburst testing according to an embodiment of the subject matter described herein. Referring to FIG. 1, environment 100 may include test platform 102 and a DUT 112. Test platform 102 may represent any suitable entity or entities (e.g., one or more computing platforms, a network equipment test device, or a server farm) for performing aspects related to microburst testing and/or other traffic testing. In some embodiments, test platform 102 may be configured to perform one or more aspects associated with testing a network, a system under test (SUT), such as DUT 112, and/or components of test platform 102. For example, test platform 102 may send microbursts of packets from test ports to test ports via DUT 112 for testing a peak traffic load and/or buffering capabilities. For example, a microburst may involve sending packets from a test port to DUT 112 faster than DUT 112 can send (e.g., switch) them to a second test port. In this example, test platform 102 may perform various microburst related tests to determine a peak load that can be sustained by DUT 112 without packet loss and/or to determine related buffering capacities.

In some embodiments, test platform 102 may be a standalone tool, a testing device, or software executing on a processor. In some embodiments, test platform 102 may be a single node or may be distributed across multiple computing platforms or nodes.

In some embodiments, test platform 102 may be integrated or co-located with a user device emulator, also referred to as a user equipment (UE) simulator. The user device emulator may include functionality for simulating or emulating one or more 3GPP (e.g., LTE or LTE-advanced) user devices or other user devices, e.g., sending communications, receiving communications, and/or testing communications capabilities of various nodes or components. For example, test platform 102 may be configured to generate control plane commands that trigger establishment of one or more tunnels for numerous emulated user devices to communicate with a packet data network, such as the Internet.

In some embodiments, test platform 102 may simulate or emulate one or more network nodes. For example, test platform 102 may emulate another network switch or forwarding device. In some embodiments, the emulated network node(s) may interact with other emulated entities (e.g., emulated user devices) and/or DUT 112.

Test platform 102 may include one or more port module(s) 110. A port module may be any suitable entity or entities (e.g., an application-specific integrated circuit (ASIC), a field-programmable gate array (FPGA), and/or software executing on a processor) for receiving data, transmitting data, and/or processing data. For example, a port module may comprise an Xcellon-Ultra™ card manufactured by IXIA® or a portion therein (e.g., a physical port with a dedicated processor and memory) and may be configured to simulate or emulate packets associated with various nodes or UEs. In this example, each port module may comprise a different portion (e.g., a separate physical port and associated resources) of the Xcellon-Ultra™ card or may be associated with a different Xcellon-Ultra™ card.

In some embodiments, port module(s) 110 may include at least one processor, memory, and/or one or more network interface cards (NICs). The NICs may receive data from or transmit data to DUT 112 or another port module via one or more physical ports, communications interfaces, or connections. In some embodiments, port module(s) 110 may include functionality for communicating using a common public radio interface (CPRI) protocol or other protocols. For example, a CPRI interface and/or link may provide data from port module(s) 110 to port module(s) 114 and vice versa.

DUT 112 may represent any suitable entity or entities (e.g., one or more computing platforms, a network switch, a network node or a SUT) for interacting with and/or for being tested and/or analyzed by test platform 102. In some embodiments, DUT 112 may include a network switch or other packet forwarding device. For example, DUT 112 may be a commercial network switch capable of receiving traffic (e.g., from test platform 102) via one or more ports, processing (e.g., switching) traffic, and/or sending traffic (e.g., to test platform 102) via one or more ports.

DUT 112 may include one or more port module(s) 114. Port module(s) 114 may be any suitable entity or entities (e.g., an ASIC, an FPGA, and/or software executing on a processor) for receiving data, transmitting data, and/or processing data and may be similar in functionality to port module 110. In some embodiments, port module(s) 110 may include at least one processor, memory, and/or one or more network interface cards (NICs).

In some embodiments, port module(s) 110 may be connected to port module(s) 114 via one or more physical links. For example, as depicted in FIG. 1, four ports 1-4 may be associated with port module(s) 110 and four ports A-D may be associated with port module(s) 114. In this example, a physical link (e.g., Ethernet cable) may connect port 1 and port A, a second physical link may connect port 2 and port B, a third physical link may connect port 3 and port C, a fourth physical link may connect port 4 and port D, and virtual links may be established between various other ports, e.g., using internal communication buses or switching matrixes associated with port module(s) 110 and/or port module(s) 114. In another example, a physical link (e.g., Ethernet cable) may connect port 1 and port A and virtual links may be established between various other ports.

In some embodiments, test platform 102 and DUT 112 may be communicatively coupled via various physical topologies and/or virtual topologies. For example, ports associated with port module(s) 110 and port module(s) 114 may be communicatively coupled via a full mesh virtual topology, a partial mesh virtual topology or any topology described in RFCs 2285, 2544, or 2889; the disclosures of which are incorporated herein by reference in their entireties.

In some embodiments, ports associated with port module(s) 110 and port module(s) 114 may be communicative coupled (e.g., virtually connected) via a full mesh virtual topology. For example, port 1 may be communicatively coupled to ports 2-4 and ports A-D, port 2 may be communicatively coupled to ports 1, 3, and 4 and ports A-D, port 3 may be communicatively coupled to ports 1, 2, and 4 and ports A-D, and port 4 may be communicatively coupled to ports 1-3 and ports A-D.

Test platform 102 may include one or more processor(s) 104, a tester and analyzer module (TAM) 106, and a TAM storage 108. Processor(s) 104 may be any suitable entity or entities for executing software and/or modules (e.g., TAM 106) stored in a memory (e.g., TAM storage 108 and/or other memory). In some embodiments, processor(s) 104 may include a microprocessor, a central processing unit (CPU), or any other like hardware based processing unit. In some embodiments, TAM 106 and/or various aspects of the disclosed subject matter can be stored in TAM storage 108 or other memory.

TAM storage 108 may represent any suitable entity (e.g., a non-transitory computer readable medium, random access memory (RAM), read only memory (ROM), optical read/write memory, cache memory, magnetic read/write memory, flash memory, embedded memory, or a memory device) for storing data associated with traffic testing. Data stored at TAM storage 108 may include one or more traffic tests, test configurations, test results, traffic generated during tests, traffic received during tests, test statistics, test logs, and/or information about one or more DUT, e.g., DUT 112.

In some embodiments, processor(s) 104 and/or TAM storage 108 can be used to execute, implement, and/or manage the operation of various aspects of the disclosed subject matter, such as TAM 106 or portions thereof.

TAM 106 may be any suitable entity or entities (e.g., an ASIC, an FPGA, and/or software executing on processor(s) 104) for performing one or more aspects associated with traffic testing and/or related testing analysis. TAM 106 may include functionality for defining or specifying one or more microburst related tests. For example, TAM 106 may provide a user interface for allowing a test operator to configure test involving sending a number of packet flows between test ports at test platform 102 using DUT 112. In this example, each packet flow may be associated with one of ports 1-4 at port module(s) 110. Continuing with this example, after configuring the test, TAM 106 may send traffic to DUT 112 which is then switched or forwarded back to TAM 106 or a related entity.

In some embodiments, test platform 102 and/or TAM 106 may include functionality for traffic testing, test analysis, related configurations, and/or other functionality as described in RFCs 2889, 2285, and/or 2544. For example, test platform 102 and/or TAM 106 may perform testing for benchmarking switching devices, forwarding performance, congestion control, latency, address handling and/or related filtering.

In some embodiments, test platform 102 and/or TAM 106 may include functionality for performing a peak load related test that is a variant of testing described in RFC 2889. For example, test platform 102 and/or TAM 106 may perform a test designed to overload or oversubscribe ports (e.g., temporarily during a test cycle) before draining back to an original level (e.g., after the test cycle is completed). In contrast, a test in accordance with RFC 2889 is generally designed to keep port load at a constant level and/or to never overload a port.

In some embodiments, test platform 102 and/or TAM 106 may include functionality for testing different aspects of DUT 112. For example, TAM 106 may perform a test in accordance with RFC 2889 for testing the ability of DUT 112 to handle constantly changing routing without getting "stuck" (e.g., experiencing packet loss or other issue). In another example, TAM 106 may perform a peak load related test in accordance with the subject matter described herein for testing the ability of DUT 112 to dynamically move or allocate shared buffers to the ports that need it at the moment. In some embodiments, a feature of both tests is that a properly implemented DUT 112 can run the test forever (e.g., indefinitely) without running out of resources.

In some embodiments, test platform 102 and/or TAM 106 may include functionality for measuring packet loss, latency, and/or jitter associated with a spiky transmission pattern (e.g., one or microbursts). For example, TAM 106 may initiate a test involving a number of ports at port module(s) 110, where each port is associated with a different medium access control (MAC) addresses. In this example, each test may include a number of test cycles and each test cycle may be divided into a number of time intervals. The number of time intervals in a test cycle may correspond to the number of ports and a replication count (e.g., four ports and a replication count of one may indicate a total of four time intervals, whereas four ports and a replication count of two may indicate a total of eight time intervals). For example, during each time interval, N−1 packets, e.g., where N=4 (the number of ports), may be sent to a same port (e.g., one of ports 1-4) via DUT 112, therefore the number of packets received or switched by DUT 112 is directly proportional to the number of time intervals and corresponds to the replication count associated with the test.

In some embodiments, by sending microbursts of packets to destination test ports at test platform 102 via DUT 112 (e.g., faster than DUT 112 can process or switch them), DUT 112 may queue received packets in one or more buffers. For example, DUT 112 allocate and/or use a separate packet buffer for packets destined for a particular port, e.g., a first packet buffer queues traffic destined for port 1, a second packet buffer queues traffic destined for port 2, a third packet buffer queues traffic destined for port 3, and so on and so forth. In this example, during each test cycle, a same number of packets may be sent to each port and, therefore, a same number of packets may be queued in the various packet buffers (e.g., assuming no other traffic is being sent to these particular ports via DUT 112). Continuing with this example, if the amount of packets sent to each port is equal to the number of time intervals in a test cycle and if a packet from each port is switched each time interval, then the number of packets queued in each packet buffer prior to the start of a time cycle may be the same after the time cycle is completed. Hence, in this example, if DUT 112 is functioning correctly, the test cycle may be repeated indefinitely without causing DUT 112 to crash or experience problems.

In some embodiments (e.g., where each test or test cycle equally oversubscribes or loads the packet buffers), various aspects of DUT 112 may be tested. For example, a maximum amount of packets that can be queued by DUT 112 may be identified and any issues associated with maintaining, sharing, allocating, and/or using buffers may be discovered, logged, and/or resolved.

In some embodiments, test platform 102 and/or TAM 106 may perform or execute multiple instances of a test designed to overload or oversubscribe ports. In such embodiments, each test instance may utilize a different replication count. For example, a replication count may affect how much each port is overloaded (e.g., how many packets are added to a corresponding buffer) before the corresponding buffer is drained (e.g., back to original or starting level). By executing test instances associated with different replication counts, buffer capacities and/or other buffer related metrics may be determined by identifying the highest replication count that did not result in packet loss or other problems.

In some embodiments, test platform 102 and/or TAM 106 may include functionality for searching test results associated with multiple test instances designed to overload or oversubscribe port. For example, TAM 106 may use a search algorithm for identifying a test associated with a largest replication count or packet load where no packets were lost or where latency was within an acceptable range. In this example, the test may indicate a sustainable peak load across multiple ports and/or related buffer capacities associated with DUT 112.

It will be appreciated that FIG. 1 is for illustrative purposes and that various nodes, their locations, and/or their functions (e.g., modules) described above in relation to FIG. 1 may be changed, altered, added, or removed. For example, some nodes and/or functions may be combined into a single entity. In another example, some nodes and/or functions may be distributed across multiple nodes and/or platforms.

Figure 2:
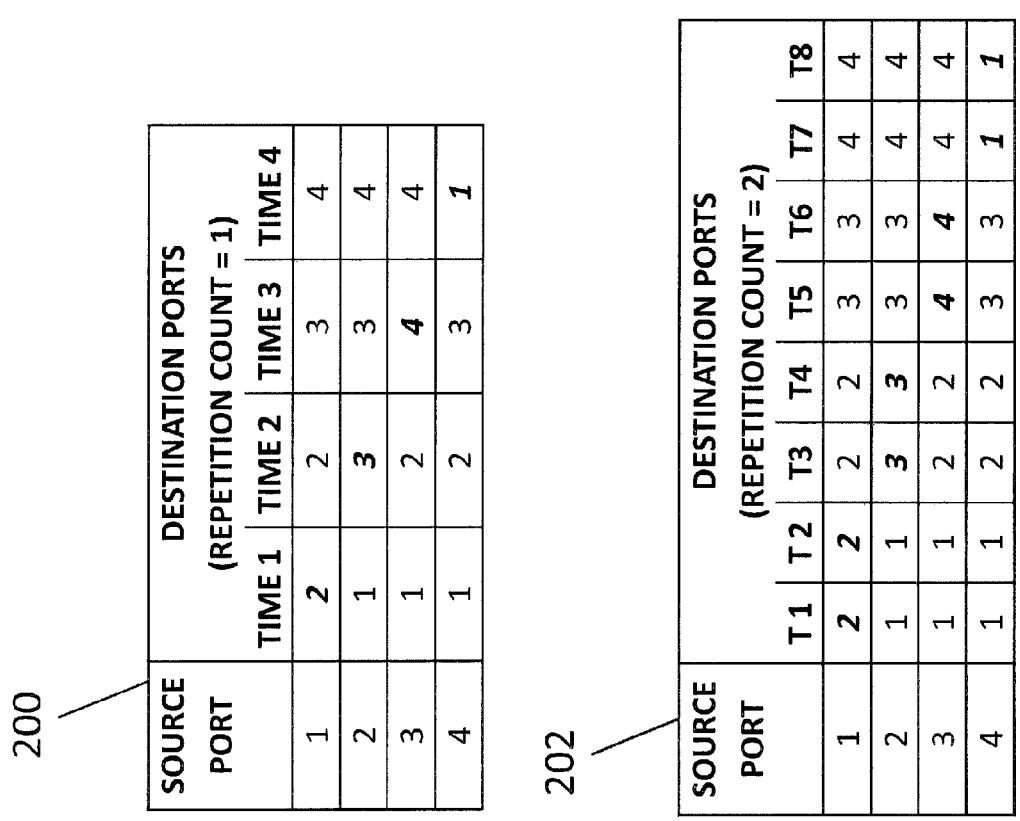
FIG. 2 is a diagram illustrating a set of test cycles according to an embodiment of the subject matter described herein.

FIG. 2 is a diagram illustrating test cycle 200 and test cycle 202 associated with microburst testing according to an embodiment of the subject matter described herein. In some embodiments, test cycle 200 or test cycle 202 may be part of a test or test instance containing a plurality of identical or similar test cycles. In some embodiments, test cycle 200 or test cycle 202 may be associated with testing various ports and/or related buffers at DUT 112.

Referring to FIG. 2, each of test cycle 200 and test cycle 202 may involve four ports 1-4, e.g., ports 1-4 at port module(s) 110, where each of ports 1-4 may be capable of sending and receiving packets (e.g., Ethernet frames and/or Internet protocol (IP) packets) during a test cycle. For example, port 1-4 may act as destination ports and port 1-4 may also act as source ports during a test cycle.

In some embodiments (e.g., where ports act as both destination and source ports), test platform 102 may be configured to avoid sending self-addressed packets, e.g., packets in which the source port is the same as the intended destination port. For example, DUT 112 may be configured to discard self addressed packets without sending the packets onward to its destination because DUT 112 may assume such packets are invalid. In this example, if test platform 102 initiate a test that used self-addressed packets then some packets would not be switched which could affect peak load testing, e.g., since the number of packets being buffered by DUT 112 may not indicate the peak load.

In some embodiments, each of test cycle 200 and test cycle 202 may be divided into equal time intervals. In some embodiments, the number of time intervals in a test cycle 200 or test cycle 202 may be equal to or a multiple of the number of source ports (e.g., transmit ports). For example, as depicted in FIG. 2, test cycle 200 may include four ports and four time intervals, where the four ports act as both source ports and destination ports and are communicatively connected via a full mesh virtual topology.

In some embodiments (e.g., where ports act as both destination and source ports), each time interval in test cycle 200 or test cycle 202 may involve N−1 source ports sending a packet to the same destination port. In embodiments where N−1 packets are received by a same port during a time interval, the port receiving the N−1 packets during a time interval may send a packet to another port instead of itself.

As depicted in FIG. 2, in time interval T1 of test cycle 200, each of source ports 2, 3, and 4 may send or transmit a packet to port 1 and port 1 may send or transmit a packet to port 2. In time interval T2 of test cycle 200, each of source ports 1, 3, and 4 may send or transmit a packet to port 2 and port 2 may send or transmit a packet to port 3. In time interval T3 of test cycle 200, each of source ports 1, 2, and 4 may send or transmit a packet to port 3 and port 3 may send or transmit a packet to port 4. In time interval T4 of test cycle 200, each of source ports 1, 2, and 3 may send or transmit a packet to port 4 and port 4 may send or transmit a packet to port 1.

By ordering the packets as indicated in time cycle 200, each port receives the same number of packets by the end of time cycle 200, thereby allowing the buffers associated with each port to be at the same level of load through out time cycle 200.

Test cycle 202 may be associated with a replication count of two. In some embodiments, the replication count may indicate or define a number of consecutive time intervals that packets are transmitted to the same destination port of test platform 102 via DUT 112. For example, if test cycle 202 includes four source ports and is associated with a replication count of two, the number of time intervals associated with test cycle 202 may be eight, where the eight time intervals include four sets of consecutive time intervals, where each set consecutive time intervals indicates identical port destinations for packets.

As depicted in FIG. 2, in time intervals T1 and T2 of test cycle 202, each of ports 2, 3, and 4 may send or transmit a packet to port 1 and port 1 may send or transmit a packet to port 2. In time intervals T3 and T4 of test cycle 300, each of source ports 1, 3, and 4 may send or transmit a packet to port 2 and port 2 may send or transmit a packet to port 3. In time intervals T5 and 16 of test cycle 300, each of source ports 1, 2, and 4 may send or transmit a packet to port 3 and port 3 may send or transmit a packet to port 4. In time intervals T7 and T8 of test cycle 300, each of source ports 1, 2, and 3 may send or transmit a packet to port 4 and port 4 may send or transmit a packet to port 1.

By ordering the packets as indicated in time cycle 202, each port receives the same number of packets by the end of time cycle 202, thereby allowing the buffers associated with each port to be at the same level of load through out time cycle 202. Moreover, since time cycle 202 is associated with a replication count of two, the number of packets received by each port after time cycle 202 is twice the number of packets received after time cycle 200.

In some embodiments, ports used in a test cycle may be associated with multiple addresses. For example, each of ports 1-4 may be associated with two IP addresses and, as such, may send, during a test cycle, packets to destination ports using each IP address. In this example, a test cycle may include twice as many time intervals as a test cycle where each of ports 1-4 is associated with a single IP address. Continuing with this example, during a time interval of the test cycle, a port may transmit a packet as originating from a first IP address and, during a subsequent time interval, the port may transmit another packet as originating from a second IP address.

It will be appreciated that test cycle 200 and test cycle 202 in FIG. 2 are for illustrative purposes and that different and/or additional information may be usable for facilitating microburst testing and/or other related functionality.

Figure 3:
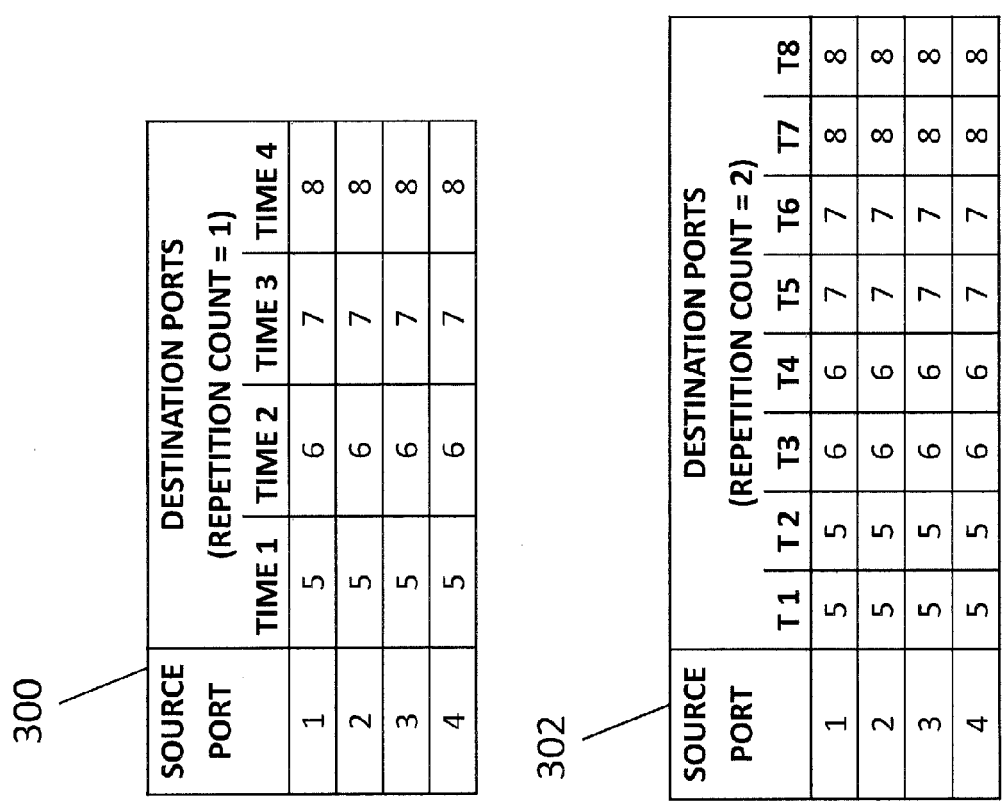
FIG. 3 is a diagram illustrating another set of test cycles according to an embodiment of the subject matter described herein.

FIG. 3 is a diagram illustrating test cycle 300 and test cycle 302 associated with microburst testing according to an embodiment of the subject matter described herein. In some embodiments, test cycle 300 or test cycle 302 may be part of a test or test instance containing a plurality of identical or similar test cycles. In some embodiments, test cycle 300 or test cycle 302 may be associated with testing various ports and/or related buffers at DUT 112.

Referring to FIG. 3, each of test cycle 300 and test cycle 302 may involve eight ports 1-8, e.g., ports 1-4 and ports 5-8 (not shown in FIG. 1) at port module(s) 110, where each of ports 1-4 may be capable of sending packets (e.g., Ethernet frames and/or Internet protocol (IP) packets) during a test cycle and where each of ports 5-8 receive packets during the test cycle. For example, port 1-4 may act as source ports and port 5-8 may also act as destination ports during a test cycle. In this example, this division of labor between two of ports may be referred to a many-to-many mapping scenario.

In some embodiments, each of test cycle 300 and test cycle 302 may be divided into equal time intervals. In some embodiments, the number of time intervals in a test cycle 300 or test cycle 302 may be equal to or a multiple of the number of source ports (e.g., transmit ports). For example, as depicted in FIG. 3, test cycle 300 may include four source ports and four time intervals.

In some embodiments, each time interval in test cycle 300 or test cycle 302 may involve N source ports sending a packet to the same destination port. For example, in a many-to-many mapping scenario, self-addressed packets are not a concern since destination ports are different from the source ports. Hence, in this example, all source ports (e.g., N ports) can transmit a packet to a particular destination port during a time interval.

As depicted in FIG. 3, in time interval T1 of test cycle 300, each of source ports 1-4 may send or transmit a packet to port 5. In time interval T2 of test cycle 300, each of source ports 1-4 may send or transmit a packet to port 6. In time interval T3 of test cycle 300, each of source ports 1-4 may send or transmit a packet to port 7. In time interval T4 of test cycle 300, each of source ports 1-4 may send or transmit a packet to port 8.

By ordering the packets as indicated in time cycle 300, each port receives the same number of packets by the end of time cycle 300, thereby allowing the buffers associated with each port to be at the same level of load through out time cycle 300.

Test cycle 302 may be associated with a replication count of two. In some embodiments, the replication count may indicate or define a number of consecutive time intervals that packets are transmitted to the same destination port of test platform 102 via DUT 112. For example, if test cycle 302 includes four source ports and is associated with a replication count of two, the number of time intervals associated with test cycle 302 may be eight, where the eight time intervals include four sets of consecutive time intervals, where each set consecutive time intervals indicates identical port destinations for packets.

As depicted in FIG. 3, in time intervals T1 and T2 of test cycle 302, each of ports 1-4 may send or transmit a packet to port 5. In time intervals T3 and T4 of test cycle 300, each of source ports 1-4 may send or transmit a packet to port 6. In time intervals T5 and T6 of test cycle 300, each of source ports 1-4 may send or transmit a packet to port 7. In time intervals T7 and T8 of test cycle 300, each of source ports 1-4 may send or transmit a packet to port 8.

By ordering the packets as indicated in time cycle 302, each port receives the same number of packets by the end of time cycle 302, thereby allowing the buffers associated with each port to be at the same level of load through out time cycle 302. Moreover, since time cycle 302 is associated with a replication count of two, the number of packets received by each port after time cycle 302 is twice the number of packets received after time cycle 300.

In some embodiments, ports used in a test cycle may be associated with multiple addresses. For example, each of ports 1-4 may be associated with two IP addresses and, as such, may send, during a test cycle, packets to destination ports using each IP address. In this example, a test cycle may include twice as many time intervals as a test cycle where each of ports 1-4 is associated with a single IP address. Continuing with this example, during a time interval of the test cycle, a port may transmit a packet as originating from a first IP address and, during a subsequent time interval, the port may transmit another packet as originating from a second IP address.

It will be appreciated that test cycle 300 and test cycle 302 in FIG. 3 is for illustrative purposes and that different and/or additional information may be usable for facilitating microburst testing and/or other related functionality.

FIGS. 4A-4B are diagrams illustrating graphical user interface (GUI) 400 and GUI 402 for searching microburst testing results according to an embodiment of the subject matter described herein. In some embodiment, testing platform 102, TAM 106, and/or another node or module may access and use test result information. For example, TAM 106 may provide GUI 400 for allowing a test operator to search test results associated with multiple test instances for identifying a largest replication count associated with a test instance yielding acceptable test results, e.g., as determined by user-defined criteria.

In some embodiments, a user may configure multiple frame sizes and multiple load rates for a microburst test involving DUT 112. For each traffic frame size and transmit load rate configured, a search algorithm (e.g., a binary search algorithm and/or a step-based search algorithm) may execute a number of test instances (e.g., test cycles or iterations) and analyze test result information associated with each test instance for determining the best (e.g., largest) replication count value for which desired statistic values (e.g., frame loss, latency, jitter, sequence errors, integrity errors, or flooded frames) are below or equal to acceptable thresholds.

In some embodiments, where a binary algorithm is utilized for determining the largest replication count, a user may define an initial replication count value (e.g., 100), a minimum replication count value (e.g., 10), a maximum replication count value (e.g., 1000), and a resolution value (e.g., 50). In this example, a search may execute a first iteration (e.g., a test instance or a test cycle) with the initial replication count value (e.g., 100). If the first iteration is successful (e.g., if all monitored statistics are below or equal to acceptable thresholds), then a second iteration may be executed with a first middle value (e.g., 550) between the initial replication count value (e.g., 100) and the maximum replication count value (e.g., 1000). If the first iteration is unsuccessful (e.g., if any monitored statistic exceeds a corresponding acceptable threshold), then the second iteration may be executed with a first middle value (e.g., 55) between the minimum replication count value (e.g., 10) and the initial replication count value (e.g., 100). The search may continue (e.g., executing iterations using a replication count value that is between (e.g., equidistant between) a previous replication count value and either the minimum replication count value (if the previous iteration was unsuccessful) or the maximum replication count value (if the previous iteration was successful)) until the delta (difference) of the replication count values between two consecutive iterations becomes smaller than the resolution value. If the search is stopped before the maximum replication count value is reached, the last successful iteration may indicate the largest replication count supported by DUT 112. If all iterations are successful, the search may complete when a final iteration is executed with the maximum replication count value. If the final iteration is successful, the largest replication count supported by DUT 112 may be the maximum replication count value.

In some embodiments, where a step algorithm is utilized for determining the largest replication count, a user may define an initial replication count value (e.g., 10), a maximum replication count value (e.g., 100), and a step value (e.g., 5). In this example, a search may execute a first iteration with the initial replication count value (e.g., 10). If the first iteration is successful (e.g., if all monitored statistics are below or equal to acceptable thresholds), then the next iteration may be executed with a new replication count value (e.g., 15) computed by incrementing the previous replication count value (e.g., 10) by the step value (e.g., 5). Any unsuccessful iteration (e.g., an iteration where a monitored statistic exceeds a corresponding acceptable threshold) may stop the search. If the search is stopped before the maximum replication count value is reached, the last successful iteration may indicate the largest replication count supported by DUT 112. If all iterations are successful, the search may complete when a final iteration is executed with the maximum replication count value. If the final iteration is successful, the largest replication count supported by DUT 112 may be the maximum replication count value.

In some embodiments, search criteria may include various statistics and/or factors. For example, depending on the statistics enabled for the test instances, a user may define certain thresholds for packet loss, latency, jitter, sequence errors, integrity errors, and/or flooded frames. In this example, a search algorithm may be configured to use these thresholds when determining whether a particular test instance yields acceptable tests results. By using multiple search criteria, DUT 112 may be analyzed for various issues. For example, by identifying acceptable test instances using latency and/or jitter in addition to packet loss, it may be determined that while DUT 112 has large enough buffers to prevent packet loss, a buffering technique utilized by DUT 112 introduces latency or jitter that degrades performance and is unacceptable for some applications.

Referring to FIG. 4A, GUI 400 may include user interface (UI) elements for configuring a step-based search associated with peak load or microburst testing. In some embodiments, GUI 400 may include one or more UI elements for inputting search parameters indicating how long or how many different test results are to be searched, e.g., a load type, an initial count, an end count, and/or a step count.

In some embodiments, GUI 400 may include one or more UI elements for inputting search criteria for determining acceptable test results. In some embodiments, search criteria may be based on available statistics maintained for a group of test instances (e.g., iterations). Examples of search criteria that may be used for determining acceptable test results may include limits, rates, and/or percentages associated with frame (e.g., packet) loss, latency, jitter, sequential errors, integrity errors, and/or flooded frames. For example, GUI 400 may include UI elements for inputting a packet loss threshold represented as a percentage not to be exceeded, e.g., 1% of the total amount of packets transmitted. In another example, GUI 400 may include UI elements for inputting a latency threshold as a user-defined value, e.g., less than or equal to a 10 microseconds average time per port. In yet another example, GUI 400 may include UI elements for inputting a flooded frames threshold by indicating a value that is not to be exceeded, e.g., less than or equal to 10 flooded frames per test instance.

Referring to FIG. 4B, GUI 402 may include UI elements for configuring a binary search associated with peak load or microburst testing. In some embodiments, GUI 402 may include one or more UI elements for inputting search parameters indicating how long or how many different test results are to be searched, e.g., a load type, an initial count, a maximum count, a minimum count, a resolution value, and/or a backoff percentage.

In some embodiments, GUI 402 may include one or more UI elements for inputting search criteria for determining acceptable test results. In some embodiments, search criteria may be based on available statistics maintained for a group of test instances (e.g., iterations). Examples of search criteria that may be used for determining acceptable test results may include limits, rates, and/or percentages associated with frame (e.g., packet) loss, latency, jitter, sequential errors, integrity errors, and/or flooded frames. For example, GUI 402 may include UI elements for inputting a packet loss threshold represented as a percentage not to be exceeded, e.g., 1% of the total amount of packets transmitted.

In some embodiments, after performing a search using user-defined search criteria, GUI 400 may provide search results via GUI 400, GUI 402, or a related GUI. For example, GUI may provide a replication count and/or other search related information via one or more UI elements. In another example, after a search is performed, a replication count and related statistics may be reported based on per transmit rate used and per traffic frame size used in a grid UI element in a pop-up window associated with GUI 400.

It will be appreciated that GUI 400 and GUI 402 in FIGS. 4A-4B are for illustrative purposes and that different and/or additional information than the information depicted in GUI 400 and GUI 402 may be usable for searching test result information associated with microburst testing.

Figure 5:
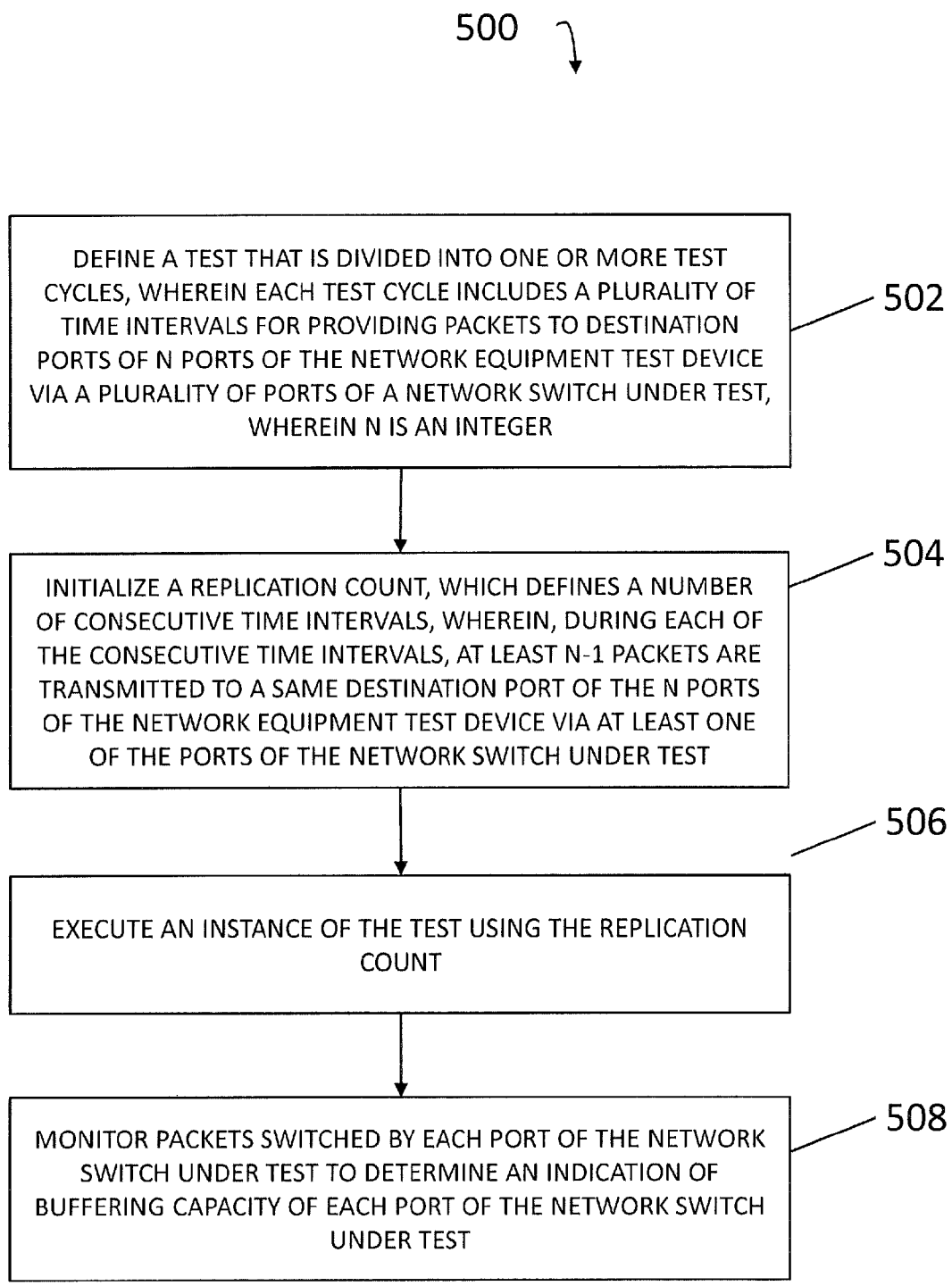
FIG. 5 is a diagram illustrating a process for microburst testing according to an embodiment of the subject matter described herein.

FIG. 5 is a diagram illustrating a process 500 for microburst testing according to an embodiment of the subject matter described herein. In some embodiments, process 500, or portions thereof, may be performed by or at test platform 102, TAM 106, and/or another node (e.g., DUT 112) or module. In some embodiments, process 500 may include steps 502, 504, 506, and/or 508.

Referring to process 500, in step 502, a test may be defined that is divided into one or more test cycles. In some embodiments, each test cycle may include a plurality of time intervals for providing packets to destination ports of N ports of a network equipment test device via a plurality of ports of a network switch under test, wherein N is an integer.

In step 504, a replication count may be initiated. In some embodiments, a replication count may define a number of consecutive time intervals, wherein, during each of the consecutive time intervals, at least N−1 packets are transmitted to a same destination port of the N ports of the network equipment test device via at least one of the ports of the network switch under test.

In step 506, an instance of the test may be executed using the replication count. In some embodiments, a plurality of instances of the test (e.g., test of step 502) may be executed using a plurality of different values of replication counts.

In step 508, packets switched (e.g., received and/or sent) by each port of the network switch under test may be monitored to determine an indication of buffering capacity of each port of the network switch under test.

In some embodiments, a search of results of a plurality of instances of the test (e.g., test of step 502) may be conducted for identifying a largest replication count associated with a test instance yielding acceptable test results for the network switch under test.

In some embodiments, a search of results of a plurality of instances of the test (e.g., test of step 502) may include using a binary or a step algorithm to identify the largest replication count that did not result in packet loss by a network switch under test.

In some embodiments (e.g., when searching microburst test results for a highest replication count), acceptable test results may include an acceptable amount of packet loss, latency, jitter, sequential errors, or flooded packets.

In some embodiments, a plurality of ports of a network switch under test and a plurality of ports of a network equipment test device may be connected via a full mesh topology and the plurality of ports of the network switch under test and the plurality of ports of the network equipment test device may be configured to send and/or receive packets.

In some embodiments, each of N ports of the network equipment test device may be a destination port for one or more packets during a first test cycle.

In some embodiments (e.g., where each of N ports of the network equipment test device may be a destination port during a first test cycle), during a first time interval of a first test cycle, N−1 ports of the N ports of the network equipment test device transmits, via a network switch under test, packets destined for a first port.

In some embodiments, during a first time interval, a first port may transmit, via a network switch under test, a packet destined to a second port of N ports of a network equipment test device. In such embodiments, the first port may transmit the packet so as to avoid transmitting a self-addressed packet.

In some embodiments, packets received by each port of a network switch under test may include a frame, an Ethernet message, a transmission control protocol (TCP) message, a user datagram protocol (UDP) message, an Internet protocol (IP) message, or a hypertext transfer protocol (HTTP) message.

It will be appreciated that process 500 is for illustrative purposes and that different and/or additional actions may be used. It will also be appreciated that various actions described herein may occur in a different order or sequence.

It should be noted that test platform 102, TAM 106, and/or functionality described herein may constitute a special purpose computing device. Further, test platform 102, TAM 106, and/or functionality described herein can improve the technological field of microburst testing by providing mechanisms for peak traffic ordering such that all ports being tested receive an equal number of packets during a test or test cycle. Further, test platform 102, TAM 106, and/or functionality described herein can improve the technological field of microburst testing by providing mechanisms to search and/or identify a largest replication count and/or related buffer capacity associated with a test instance yielding acceptable test results, e.g., using a search algorithm based on user-defined search criteria. By providing an equal amount of packets to the ports (e.g., causing oversubscription in turn to each destination port) and monitoring test results related to replication counts, various aspects of a DUT can be tested, including buffer capacities and buffering techniques.

The subject matter described herein relating to microburst testing improves the functionality of test platforms by providing mechanisms for peak traffic ordering such that all ports being tested receive an equal number of packets during a test or test cycle. Further, the subject matter described herein relating to microburst testing improves the functionality of test platforms by providing mechanisms to search and/or identify a largest replication count and/or related buffer capacity associated with a test instance yielding acceptable test results, e.g., using a search algorithm based on user-defined search criteria. It should also be noted that a computing platform that implements subject matter described herein may comprise a special purpose computing device (e.g., an IxNetwork™ platform, a test platform, or module therein) usable for microburst testing.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for microburst testing, the method comprising:
    defining a test that is divided into one or more test cycles, wherein each test cycle is divided into a number of time intervals for providing packets to destination ports of N ports of a network equipment test device via a plurality of ports of a network switch under test, wherein N is an integer;
    initializing a replication count, which defines a number of consecutive time intervals during which each of N−1 of the N ports transmits a same number of packets to a same destination port of the N ports of the network equipment test device via at least one of the ports of the network switch under test,
    executing an instance of the test using the replication count, wherein the number of time intervals during each of the test cycles is equal to N times the replication count, the replication count is initialized to a value of at least two, and, during a first time interval in a first test cycle, each of the N−1 ports transmits the same number of packets to the same destination port, and, during a second time interval of the first test cycle, each of the N−1 ports repeats its transmission of the same number of packets to the same destination port to which the N−1 ports transmitted packets during the first time interval; and
    monitoring packets switched by each port of the network switch under test to determine an indication of buffering capacity of each port of the network switch under test.

2. The method of claim 1 comprising executing a plurality of instances of the test using a plurality of different replication counts.

3. The method of claim 2 comprising conducting a search of results of the plurality of instances of the test for identifying a largest replication count associated with a test instance yielding user-specified test results for the network switch under test.

4. The method of claim 3 wherein the user-specified test results include an amount of packet loss, latency, jitter, sequential errors, or flooded packets specified by a user via a graphical user interface.

5. The method of claim 1 wherein, for each test cycle, the network switch under test forwards a same number of packets to each destination port of the N ports of the network equipment test device.

6. The method of claim 1 wherein each of the N ports of the network equipment test device is a destination port for one or more packets during the first test cycle.

7. The method of claim 1 wherein the packets received by each port of the network switch under test includes a frame, an Ethernet message, a transmission control protocol (TCP) message, a user datagram protocol (UDP) message, an Internet protocol (IP) message, or a hypertext transfer protocol (HTTP) message.

8. A system for microburst testing, the system comprising:
    at least one processor; and
    a network equipment test device implemented using the at least one processor, the network equipment test device configured to:
    define a test that is divided into one or more test cycles, wherein each test cycle includes a plurality of time intervals for providing packets to destination ports of N ports of the network equipment test device via a plurality of ports of a network switch under test, wherein N is an integer;
    initialize a replication count, which defines a number of consecutive time intervals during which each of N−1 of the N ports transmits a same number of packets to a same destination port of the N ports of the network equipment test device via at least one of the ports of the network switch under test;
    execute an instance of the test using the replication count, wherein the number of time intervals during each of the test cycles is equal to N times the replication count, the replication count is initialized to a value of at least two, and, during a first time interval in a first test cycle, each of the N−1 ports transmits the same number of packets to the same destination port, and, during a second time interval of the first test cycle, each of the N−1 ports repeats its transmission of the same number of packets to the same destination port to which the N−1 ports transmitted packets during the first time interval; and
    monitor packets switched by each port of the network switch under test to determine an indication of buffering capacity of each port of the network switch under test.

9. The system of claim 8 wherein the network equipment test device is configured to execute a plurality of instances of the test using a plurality of different replication counts.

10. The system of claim 9 wherein the network equipment test device is configured to conduct a search of results of the plurality of instances of the test for identifying a largest replication count associated with a test instance yielding user-specified test results for the network switch under test.

11. The system of claim 10 wherein the user-specified test results include an amount of packet loss, latency, jitter, sequential errors, or flooded packets specified by a user via a graphical user interface.

12. The system of claim 8 wherein, for each test cycle, the network switch under test forwards a same number of packets to each destination port of the N ports of the network equipment test device.

13. The system of claim 8 wherein each of the N ports of the network equipment test device is a destination port for one or more packets during the first test cycle.

14. The system of claim 8 wherein the packets received by each port of the network switch under test includes a frame, an Ethernet message, a transmission control protocol (TCP) message, a user datagram protocol (UDP) message, an Internet protocol (IP) message, or a hypertext transfer protocol (HTTP) message.

15. A non-transitory computer readable medium having stored thereon executable instructions that when executed by a processor of a computer cause the computer to perform steps comprising:

defining a test that is divided into one or more test cycles, wherein each test cycle is divided into a number of time intervals for providing packets to destination ports of N ports of a network equipment test device via a plurality of ports of a network switch under test, wherein N is an integer;

initializing a replication count, which defines a number of consecutive time intervals during which each of N−1 of the N ports transmits a same number of packets to a same destination port of the N ports of the network equipment test device via at least one of the ports of the network switch under test;

executing an instance of the test using the replication count, wherein the number of time intervals during each of the test cycles is equal to N times the replication count, the replication count is initialized to a value of at least two, and, during a first time interval in a first test cycle, each of the N−1 ports transmits the same number of packets to the same destination port, and, during a second time interval of the first test cycle, each of the N−1 ports repeats its transmission of the same number of packets to the same destination port to which the N−1 ports transmitted packets during the first time interval; and monitoring packets switched by each port of the network switch under test to determine an indication of buffering capacity of each port of the network switch under test.

* * * * *